United States Patent
Barth et al.

(10) Patent No.: US 10,031,624 B2
(45) Date of Patent: Jul. 24, 2018

(54) SYSTEM AND METHOD FOR MONITORING 3D SPACE IN FRONT OF AN OUTPUT UNIT FOR THE CONTROL OF THE OUTPUT UNIT

(71) Applicant: Delphi Technologies, Inc., Troy, MI (US)

(72) Inventors: Alexander Barth, Wuppertal (DE); Piotr Bando, Cracow (PL); Roland Hollemann, Seesen (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 15/368,741

(22) Filed: Dec. 5, 2016

(65) Prior Publication Data

US 2017/0192617 A1  Jul. 6, 2017

(30) Foreign Application Priority Data

Dec. 18, 2015  (EP) .................................... 15201193

(51) Int. Cl.
| | | |
|---|---|---|
| *G06F 3/042* | (2006.01) | |
| *G06F 3/041* | (2006.01) | |
| *G06K 9/00* | (2006.01) | |
| *G06F 3/01* | (2006.01) | |
| *H04N 13/02* | (2006.01) | |

(52) U.S. Cl.
CPC ............ *G06F 3/0425* (2013.01); *G06F 3/011* (2013.01); *G06F 3/017* (2013.01); *G06F 3/0416* (2013.01); *G06K 9/00375* (2013.01); *H04N 13/0203* (2013.01)

(58) Field of Classification Search
CPC ........ G06F 3/011; G06F 3/017; G06F 3/0416; G06F 3/0425; G06K 9/00375; H04N 13/0203
USPC ......... 345/156–184, 441; 715/765, 769, 856, 715/711, 773
See application file for complete search history.

(56) References Cited

U.S. PATENT DOCUMENTS

| | | |
|---|---|---|
| 2009/0327977 A1 | 12/2009 | Bachfischer et al. |
| 2011/0083089 A1 | 4/2011 | Michel et al. |
| 2013/0088434 A1* | 4/2013 | Masuda ................ G06F 1/3262 345/173 |

(Continued)

FOREIGN PATENT DOCUMENTS

| | | |
|---|---|---|
| DE | 10 2006 037156 A1 | 9/2007 |
| DE | 10 2007 039669 A1 | 2/2009 |

(Continued)

*Primary Examiner* — Prabodh M Dharia
(74) *Attorney, Agent, or Firm* — Lawrence D. Hazelton (57) ABSTRACT

A system for monitoring 3D space in front of an output unit for the control of the output unit comprises a 3D imaging unit, a processing and control unit coupled to the 3D imaging unit and an output unit comprising a display area and coupled to the processing and control unit. The 3D imaging unit is configured to monitor an interaction zone in front of the display area of the output unit. The processing and control unit is configured to predict where a finger of a hand that approaches the display area of the output unit and is monitored by the 3D imaging unit will touch the display area and to control the output unit to modify content displayed on the display area based on the predicted touch position.

10 Claims, 6 Drawing Sheets

(56) References Cited

U.S. PATENT DOCUMENTS

| | | | |
|---|---|---|---|
| 2013/0120319 A1* | 5/2013 | Givon | G06F 3/0425 345/175 |
| 2013/0155070 A1* | 6/2013 | Luo | G06T 11/20 345/441 |
| 2013/0222329 A1* | 8/2013 | Larsby | G06F 3/04883 345/174 |
| 2013/0257761 A1* | 10/2013 | Karlsson | G06F 3/041 345/173 |
| 2014/0292723 A1* | 10/2014 | Suzuki | G06F 3/04883 345/175 |
| 2015/0049063 A1* | 2/2015 | Smith | G06F 3/0421 345/175 |
| 2015/0130771 A1* | 5/2015 | Feng | G06F 3/0488 345/178 |
| 2015/0277760 A1* | 10/2015 | Tagaya | G06F 3/0488 715/711 |
| 2015/0324084 A1* | 11/2015 | Chen | G06F 3/0488 345/173 |
| 2015/0355778 A1* | 12/2015 | Kim | G06F 3/0416 345/173 |
| 2015/0370472 A1* | 12/2015 | Privault | G06F 3/04883 715/769 |
| 2016/0077665 A1* | 3/2016 | Paek | G06F 3/04883 345/173 |
| 2016/0085440 A1* | 3/2016 | Canoy | G06F 3/04886 715/773 |
| 2016/0291788 A1* | 10/2016 | Johansson | G06F 3/0488 |
| 2017/0017344 A1* | 1/2017 | Kuribayashi | G06F 3/0418 |
| 2017/0017393 A1* | 1/2017 | Luo | G06F 3/04886 |
| 2017/0179996 A1* | 6/2017 | Knepper | H04B 1/40 |
| 2017/0206193 A1* | 7/2017 | Bi | G06F 17/276 |

FOREIGN PATENT DOCUMENTS

| | | |
|---|---|---|
| DE | 10 2008 005106 A1 | 7/2009 |
| EP | 2 887 318 A1 | 6/2015 |

\* cited by examiner

SYSTEM AND METHOD FOR MONITORING 3D SPACE IN FRONT OF AN OUTPUT UNIT FOR THE CONTROL OF THE OUTPUT UNIT

CROSS-REFERENCE TO RELATED APPLICATION

This application claims the benefit under 35 U.S.C. § 119(a) of European Patent Application EP 15201193.8, filed Dec. 18, 2015, the entire disclosure of which is hereby incorporated herein by reference.

TECHNICAL FIELD OF INVENTION

This disclosure generally relates to a system and a method for monitoring 3D space in front of an output unit for the control of the output unit.

BACKGROUND OF INVENTION

In-vehicle touch screen operation can be challenging if driving at high velocities or on bumpy roads. The hand of a user is not as stable while driving compared to operating the system in a stationary environment. As a result, the intended touch position might differ from the actual touch position, which potentially causes user frustration. In order to minimize the risk of hitting the wrong position and avoid false operation of the system, design elements such as icons or buttons displayed on the touch screen have to be sufficiently large and separated spatially. However, this reduces the maximum number of icons or buttons that can be arranged on the touch screen.

SUMMARY OF THE INVENTION

It is therefore an object of the invention to provide a system and a method for monitoring 3D space in front of an output unit for the control of the output unit, wherein the system and the method allow for using smaller and less distant elements displayed by the output unit while minimizing the risk of hitting the wrong position.

The aforementioned object is solved by the features of the independent claims.

A system for monitoring 3D space in front of an output unit for the control of the output unit comprises a 3D imaging unit, a processing and control unit coupled to the 3D imaging unit and an output unit comprising a display area and coupled to the processing and control unit. The 3D imaging unit is configured to monitor an interaction zone in front of the display area of the output unit. The processing and control unit is configured to predict where a hand, in particular a finger of the hand, that approaches the display area of the output unit and is monitored by the 3D imaging unit will touch the display area and to control the output unit to modify content displayed on the display area based on the predicted touch position.

Based on the knowledge where and, in particular, when the hand or the finger will touch the display area before the hand or the finger is actually touching the display area, a specific action can be triggered to adapt or change the screen content. The system improves the usability of the output unit, which is, in particular, an in-vehicle touch screen, as well as the user experience in particular if there are several icons nearby and there is a high chance that the user hits the wrong icon accidentally. The system thus allows for using smaller and less distant icons, while keeping the advantages of using larger icons and larger distances and thus minimizing the risk of hitting the wrong position.

According to an embodiment, the output unit is configured to display a plurality of elements, such as icons or buttons, on the display area, wherein at least one of the elements is highlighted and/or enlarged if the processing and control unit predicts that the hand or the finger will touch the at least one of the elements. In addition or alternatively, it is also possible to show or hide content displayed on the display area if the processing and control unit predicts that the hand or the finger will touch the at least one of the elements.

The processing and control unit may be configured to identify a hand with an exposed index finger in an image received from the 3D imaging unit. It is possible that all other configurations of a hand identified in the images received from the 3D imaging unit are discarded.

In one embodiment, the processing and control unit is configured to localize a finger-tip and a finger base of the finger and to fit a straight line through the finger-tip and the finger base. The finger base is the intersection point between the hand and the finger. Further, the hand center may be localized by the processing and control unit. The hand center may be defined as the mass center of the palm of the hand.

The processing and control unit may then compute an intersection line of a plane through the line and a camera origin of the 3D imaging unit with the display area, wherein the predicted touch position of the finger lies on the intersection line. In addition or alternatively, the processing and control unit may compute an intersection point of the line through the finger-tip and the finger base with the display area. In particular, the intersection point represents the predicted touch position of the finger.

Further, the processing and control unit may compute a distance between the finger-tip and the predicted touch position, a velocity of the finger-tip and the time when the finger-tip will touch the display area. A control signal transmitted by the processing and control unit to the output unit to modify the displayed content can be based on the intersection point and the time to touch the display area.

According to a further embodiment, the processing and control unit comprises a 2D map representing the display area and comprising a plurality of cells. Further, a numeric value is assigned to each of the cells. The processing and control unit computes the intersection point of the line with the display area in consecutive time steps. For each of the time steps one of the cells that comprises the computed intersection point is identified. The numeric value assigned to the identified cell is then incremented. The processing and control unit can use the 2D map to predict the touch position of the finger.

The processing and control unit may be configured to find peaks in the 2D map for each of the time steps in order to identify the predicted touch position of the finger.

According to yet a further embodiment, the processing and control unit is configured to increment numeric values assigned to cells located within a certain distance around the identified cell for each of the time steps, wherein the distance depends on an uncertainty of the computed intersection point.

The system may be integrated in a vehicle. The output unit may comprise a human machine interface, in particular a touch screen.

A method for monitoring 3D space in front of an output unit for the control of the output unit, comprises the following steps: monitoring an interaction zone in front of a display area of the output unit, predicting where a hand, in particular a finger of the hand, that approaches the display area of the output unit and is monitored will touch the display area, and controlling the output unit to modify content displayed on the display area based on the predicted touch position.

The method may include the same embodiments as described above in connection with the system.

Further features and advantages will appear more clearly on a reading of the following detailed description of the preferred embodiment, which is given by way of non-limiting example only and with reference to the accompanying drawings.

BRIEF DESCRIPTION OF DRAWINGS

Embodiments of the invention are described in detail below with reference to the attached drawing figures of exemplary scale, wherein.

DETAILED DESCRIPTION

Figure 1:
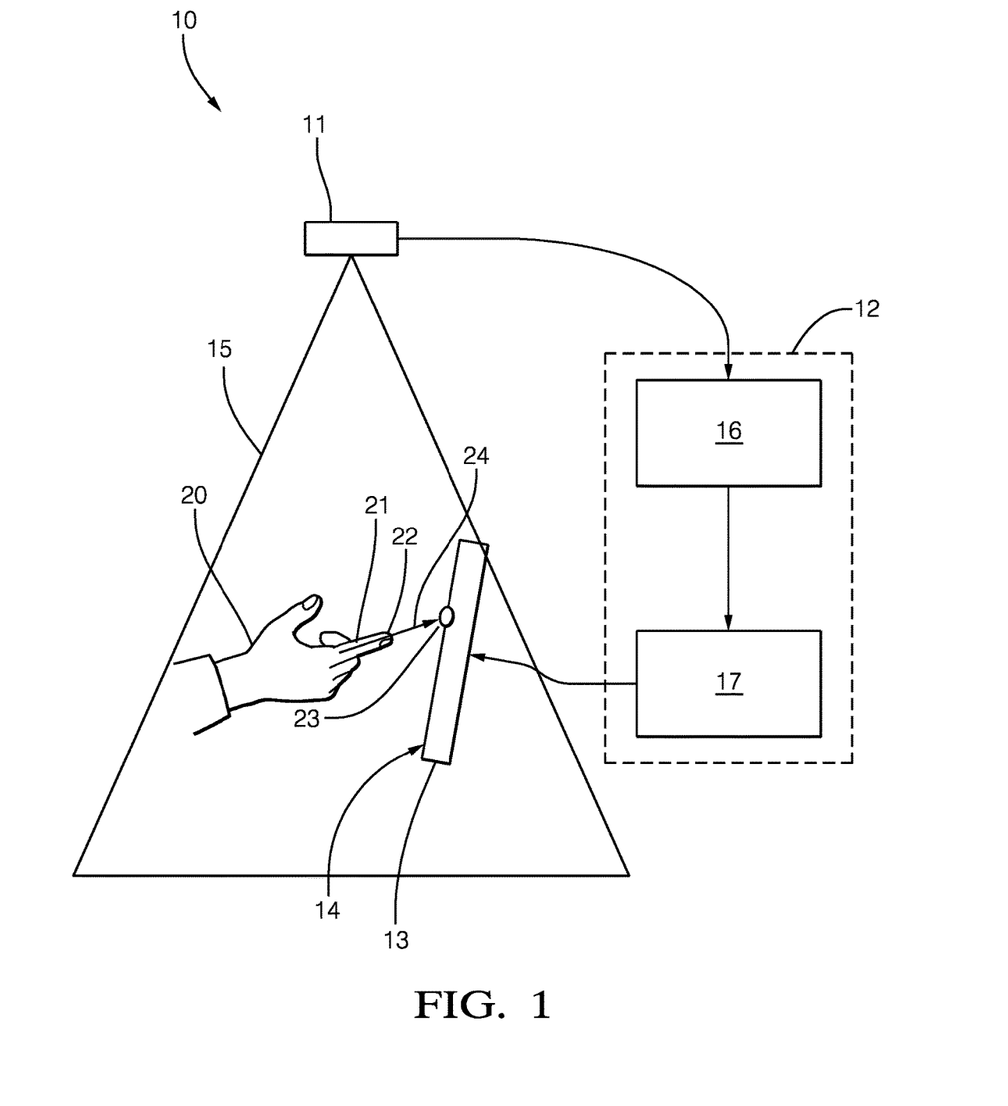
FIG. 1 is a schematic diagram of a system for predicting a touch position of a finger-tip of a user on an output unit and adapting content displayed by the output unit based on the predicted touch position.

Referring now to FIG. 1, in one embodiment, a system 10 for monitoring 3D space in front of an output unit for the control of the output unit includes a 3D imaging unit 11, a processing and control unit 12 coupled to the 3D imaging unit and an output unit 13 including a display area 14 and coupled to the processing and control unit 12. The output unit 13 can be a touch screen. The system 10 can be installed in a vehicle.

The 3D imaging unit 11 monitors a given field-of-view 15 including an interaction zone in front of the display area 14 of the output unit 13. The 3D imaging unit 11 provides both a 2D image and a depth map. The depth map is an image of the same size as the 2D image, where each pixel stores information relating to the distance of the surfaces of the subjects from the 3D imaging unit 11.

The 3D imaging unit 11 can be, for example, a time-of-flight camera or a stereo vision camera. A time-of-flight camera resolves distance based on the known speed of light, measuring the time of flight of a light signal between the camera and the subject for each point of the image. A time-of-flight camera may, for example, include an infrared light emitting diode sending out light and a camera sensor receiving the light after the light has been reflected by a subject.

In the present embodiment, the processing and control unit 12 consists of a processing unit 16 and a graphical content generator 17, which can be separate units, but can also be integrated into the same unit.

The processing and control unit 12 receives the 2D image and the depth map from the 3D imaging unit 11. With the data provided by the 3D imaging unit 11 it is possible to localize a human hand 20 in 3D space, including the hand centroid, the position and orientation of the fingers, as well as the 3D trajectory of such positions, for example the history of previous positions. In addition, one can derive a 3D velocity vector for characteristic points on the hand 20. This information can be used, for example, to compute the position of the hand 20 relative to other components of the vehicle interior and to predict the hand position ahead of time based on a given motion model, e.g., constant velocity linear motion.

Given the 3D position and 3D trajectory of the hand 20 with one or more fingers exposed, for example an index finger 21 as illustrated in FIG. 1, it is possible to predict where a finger-tip 22 of the index finger 21 will be in a short amount of time. This information can be used to not only coarsely predict that the hand 20 will be close to the display area 14 of the output unit 13, but also where it will most likely hit it, e.g., the touch screen coordinates of an intersection point 23. If the hand 20 is not in motion, the direction of the index finger 21 provides additional information about a pointing direction 24 and the potential intersection point 23 with the display area 14.

The processing unit 16 receives the 2D image and depth map from the 3D imaging unit 11 and processes the data as described in detail below. The processing unit 16 outputs a 2D coordinate on a defined planar region, e.g., the display area 14 of the output unit 13, corresponding to the predicted touch position, i.e., the intersection point 23, based on the pointing direction 24 of the index finger 21. Further, the processing unit 16 may output the current position of the finger-tip 22, the distance of the finger-tip 22 to the display area 14 and the predicted time to touch the display area 14. This data is provided to the graphical content generator 17.

If no hand is present or the hand 20 is not pointing towards the display area 14, this information is also communicated to the graphical content generator 17.

The graphical content generator 17 generates the 2D or 3D content to be shown on the display of the output unit 13, which can be, for example, an infotainment human machine interface (HMI). The graphical content generator 17 controls the output unit 13 accordingly. It can modify the content based on the predicted touch position, the distance of the finger-tip 22 to the display area 14 and the predicted time to touch the display area 14.

Based on the knowledge where and when the index finger 21 will touch the screen before it is actually touching, a specific action can be triggered to change the screen content. For example, certain control elements, such icons or buttons, can be highlighted, or enlarged, or certain content can be shown or hidden.

In addition, the content displayed by the output unit 13 can depend on the approaching direction of the hand 20. For example, the content can be different if the hand 20 approaches from the driver's side compared to an approaching direction from the co-driver's side. Further, the modification of the content can be different for upward movement and downward movement of the hand 20.

The processing and control unit 12 could be also configured such that it controls the output unit 13 to modify content displayed on the display area 14 only based on the pointing direction of a hand or a finger, for example, the index finger 21. In particular for rear seat applications where the screen can be too far away to touch it, this feature can be an interesting option.

Figure 2A:
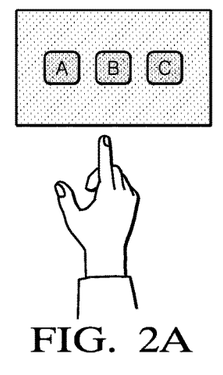
FIGS. 2A, 2B, 3A, 3B, 4A, 4B, and 4C illustrate examples of the modification of the content displayed by the output unit.
Figure 2B:
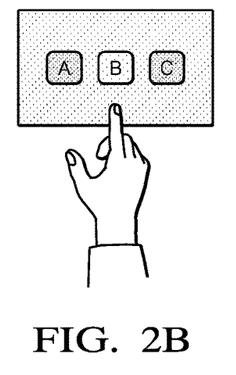
Figure 3A:
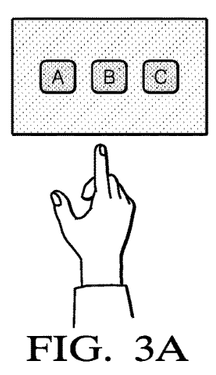
Figure 3B:
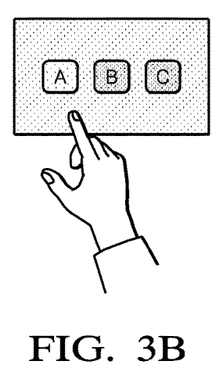
Figure 4A:
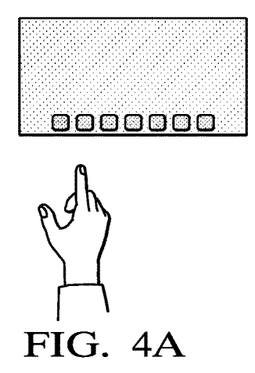
Figure 4B:
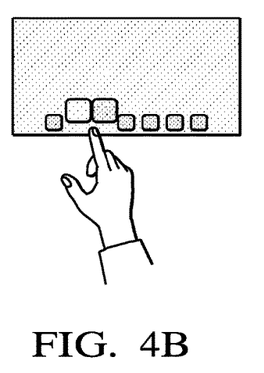
Figure 4C:
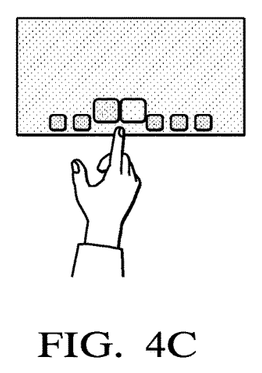

FIGS. 2A to 4C illustrate examples of the modification of the displayed content. In FIGS. 2A, 3A, and 4A the hand is far from the screen and all icons look the same. In FIG. 2B, the hand approaches the icon "B" and the target icon "B" is highlighted before the hand is actually touching the screen. In FIG. 3B, the hand approaches the icon "A" so that the icon "A" is highlighted before the hand touches the screen. In FIG. 4B, two icons close to the predicted touch position are enlarged when the hand approaches the screen. This allows the user to select the intended icon. If the predicted touch position changes as shown in FIG. 4C, the enlarged icons are adjusted.

Figure 5:
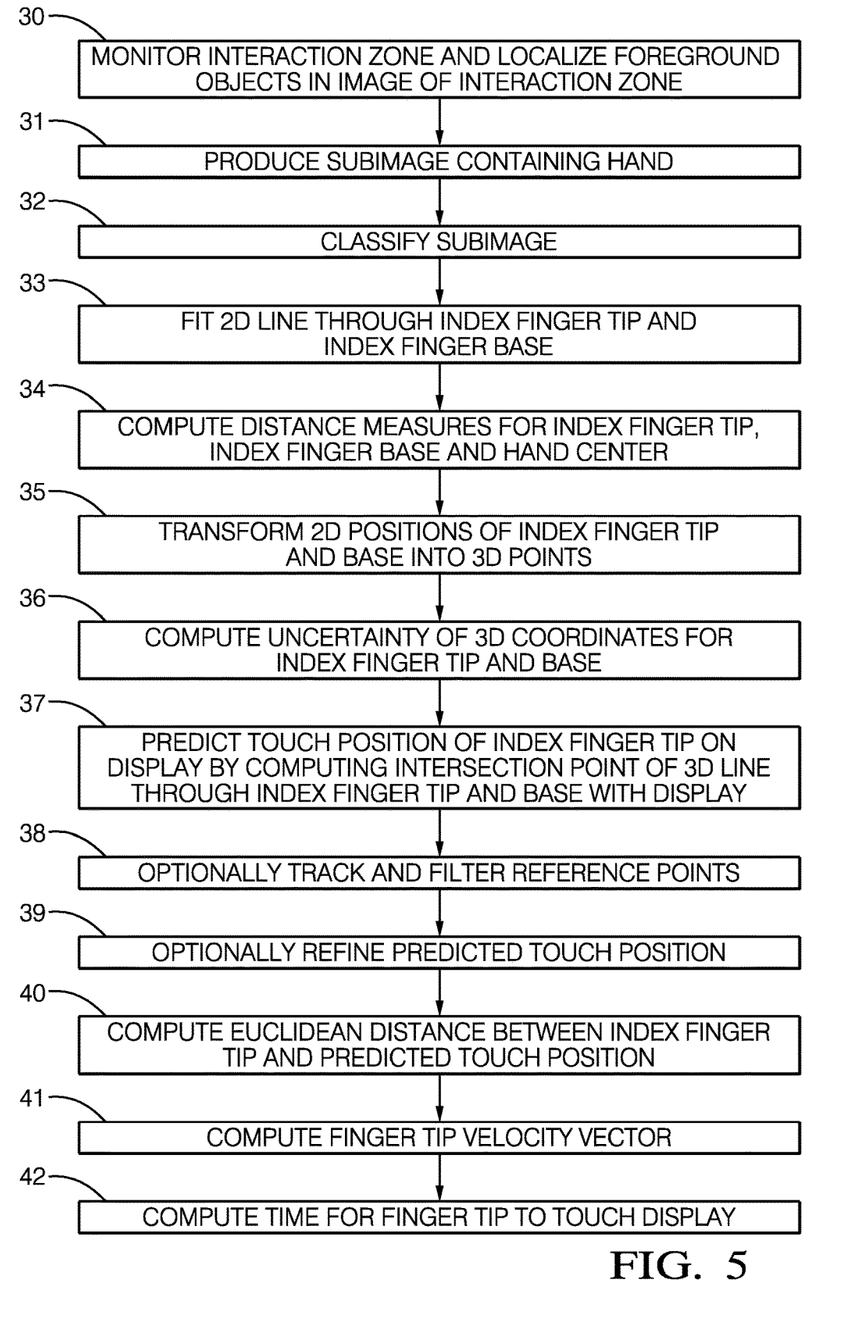
FIG. 5 is a flow chart illustrating the process of predicting the touch position of the finger-tip on the output unit.

In FIG. 5, processing steps 30 to 42 are illustrated that can be carried out by the processing and control unit 12 and, in particular, the processing unit 16.

In step 30, foreground objects are localized based on depth, amplitude and optional motion cues provided by the 3D imaging unit 11. The result is a foreground segmentation image representing a pixel-wise segmentation into foreground blobs that are groups of pixels with each group belonging to the same object. Individual pixels in that image are labeled by a blob or segment ID.

In step 31, for each segment fulfilling a number of basic criteria, e.g., minimum size, the potential hand region is localized based on size, aspect ratio, orientation and model assumptions. Segments that do not show the hand region may be discarded. The output of step 31 is a sub-image of the original amplitude image provided by the 3D imaging unit 11 that only contains the hand and, in particular, parts of the wrist. The image content is normalized so that the hand is always oriented in the same way in the sub-image, independent from the hand orientation in the original image.

For each amplitude sub-image the corresponding depth map sub-image and foreground segmentation sub-image are computed in an analog way.

Figure 6:
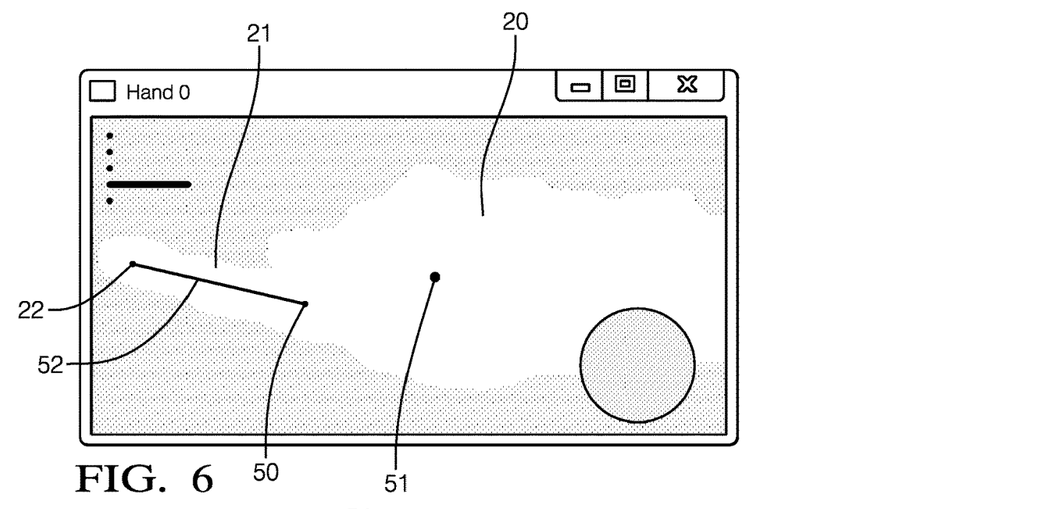
FIG. 6 shows an exemplary sub-image with a normalized hand generated in the process of FIG. 5.

FIG. 6 shows an exemplary amplitude sub-image with a normalized hand region as generated in step 31.

In step 32, each amplitude sub-image of a segment generated in step 31 is classified using computer vision/machine learning techniques or other techniques suitable for identifying a pre-determined hand pose. The corresponding depth map sub-image and foreground segmentation sub-image can be provided as additional input to such methods. Different hand configurations, e.g., one finger pointing, two fingers pointing, clamp etc., can be distinguished from non-gesture hand configurations and other objects. Only segments containing a hand with the index finger exposed with a high likelihood will be considered in the following steps. In alternative embodiments, segments containing different hand configurations could be selected, e.g., a finger different from the index finger, a flat hand, a fist or two fingers.

In step 33, the index finger is localized by analyzing the depth, amplitude, and foreground segmentation profiles in the sub-images generated in step 31. The index finger-tip, the index finger base, which is the intersection point between hand and finger, and the orientation of the index finger in the 2D image are computed by locally fitting a 2D line to the image data in the region of the exposed index finger, for example, by using iterative maximum likelihood estimation. The resulting line through index finger-tip and index finger base provides the orientation of the index finger in the image domain, and can be transformed into an upright plane in camera coordinates through the origin of the camera, where the intersection of that plane and the image plane corresponds to the line along the finger. The intersection of that plane through the camera origin and the line along the finger with a second plane, for example, the display plane, results in a 2D line. The predicted pointing position must lie on that 2D line.

In FIG. 6, the finger-tip 22 and a finger base 50 of the index finger 21, a hand center 51 and a straight line 52 through the finger-tip 22 and the finger base 50 of the index finger 21 are illustrated. The line 52 also corresponds to the projection of the pointing direction.

In step 34, robust distance measures for the index finger-tip, the index finger base and the hand center are computed by considering depth measurements within a small local neighborhood of these points (weighted average and iterative refinement based on outlier removal).

To further improve the accuracy of such depth coordinates, in particular about the finger-tip which can be sensitive to noise, the measured distances along the path in the image plane from finger-tip to finger base are also taken into account. In an iterative process with outlier detection, a linear function is fitted to the depth measurements along that path. The final depth coordinates for fingertip and finger base are computed based on the resulting linear model.

In step 35, the 2D positions of the index finger-tip and the index finger base are transformed into 3D points using the computed distances and the known intrinsic parameters of the 3D imaging unit 11. These 3D points then define a line in 3D space.

Figure 7:
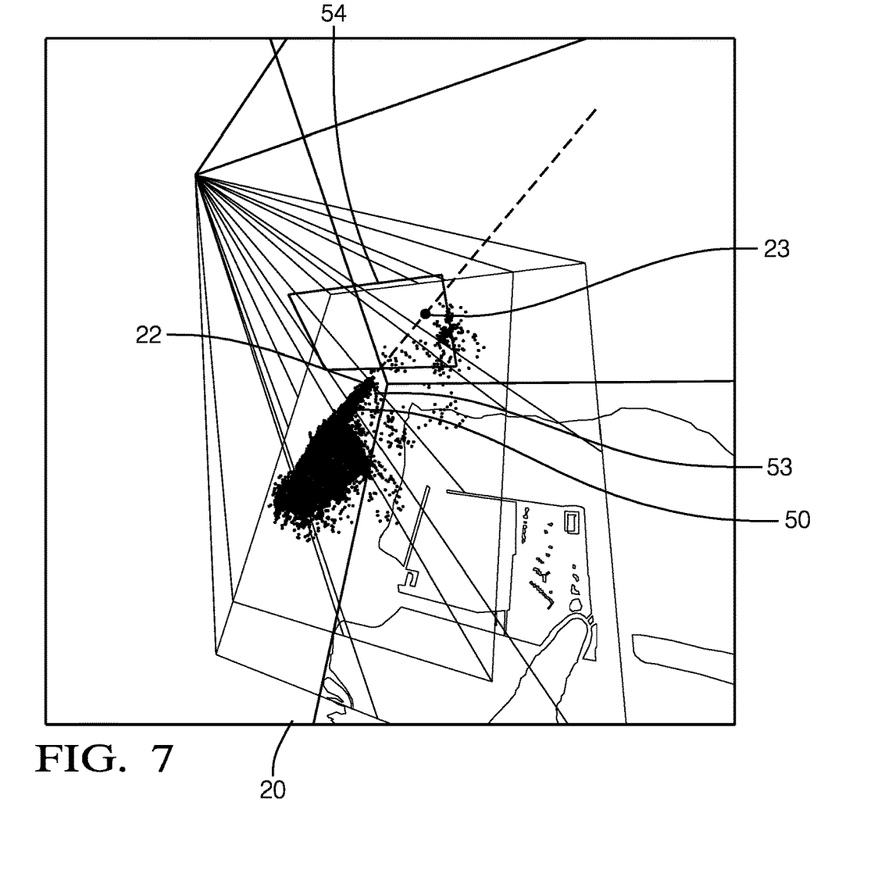
FIG. 7 shows an exemplary 3D visualization of the hand generated in the process of FIG. 5.

FIG. 7 shows an exemplary 3D visualization of the hand as generated in step 35 including the finger-tip 22 and the finger base 50 of the index finger 21 as well as a line 53 defined by the finger-tip 22 and the finger base 50.

In step 36, uncertainty of the 3D coordinates for finger-tip and hand base are computed. The uncertainty can be computed, according to one embodiment, by considering the statistical distribution of the measured data and the line fitting results. In another embodiment, the uncertainty can be derived from empirical data. In that case, the uncertainty depends on the distance of the finger-tip from the display area. The closer the finger-tip to the display area the smaller is the uncertainty. In yet another embodiment, both aforementioned embodiments can be combined. For example, the uncertainty can be computed by using both approaches and the larger of the two values of the uncertainty is used for the processing of the data.

In step 37, the intersection point of the 3D line through the index finger-tip and the index finger base with the display area, in particular the touch screen surface, is computed. This intersection point represents the "predicted touch position" based on the current observation.

In FIG. 7 the line 53 through the finger-tip 22 and the finger base 50 is extended and intersected with a virtual display area 54. The intersection point 23 is indicated by a white dot.

In step 38, the computed reference points are optionally tracked and filtered over time in order to smooth the results and to reduce measurement noise of the predicted touch position.

In step 39, the predicted touch position is optionally refined via a probabilistic mapping approach as described in detail below.

In step 40, the Euclidean distance between the finger-tip and the predicted touch position is computed.

In step 41, the finger-tip velocity vector is computed based on the finger-tip trajectory, i.e., the history of finger-tip points, for example, by means of a Kalman filter with a linear motion model (recursive update) that estimates the finger-tip velocity.

In step 42, the time the finger-tip needs to touch the display area is computed. The distance to the display area divided by the finger-tip velocity yields the time to touch.

All steps described above can, for example, be performed by software implemented in the processing and control unit 12 and, in particular, the processing unit 16.

FIGS. 8A, 8B, 9A, and 9B illustrate the influence of the uncertainty of the distance measurements to the results of the touch prediction. Each representation of FIGS. 8A, 8B, 9A, and 9B show the finger-tip 22 and the finger base 50 of the index finger 21, the virtual display area 54 and a plane 56 through the finger vector and a camera origin 58. The intersection of the plane 56 with the virtual display area 54 or, alternatively, another plane results in a 2D line 59. The predicted pointing position must lie on the 2D line 59. The 2D line 59 can be computed without the depth coordinate and is already very useful in order to restrict the search space for the predicted touch position. In particular, it can restrict the number of elements on the display area 14, e.g. buttons, which are potentially targeted. In connection with depth information it is possible to compute the intersection point 23.

Figure 8A:
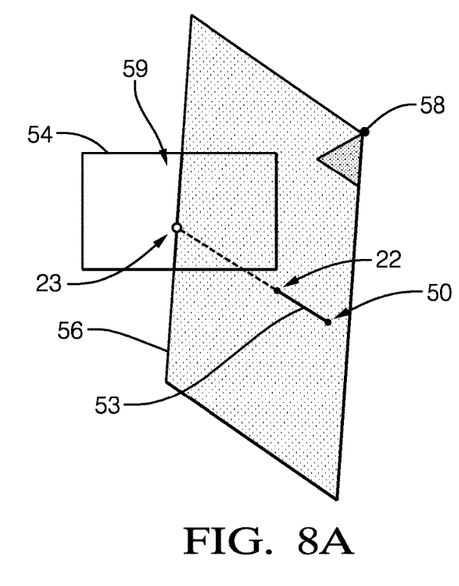
FIGS. 8A, 8B, 9A, and 9B illustrate the influence of uncertainty of distance measurements to the results of the touch prediction.
Figure 8B:
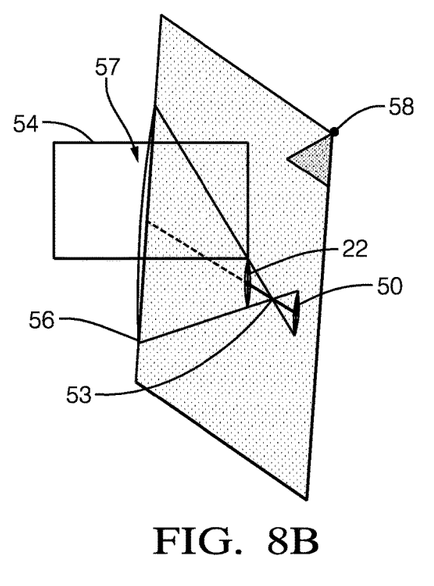
Figure 9A:
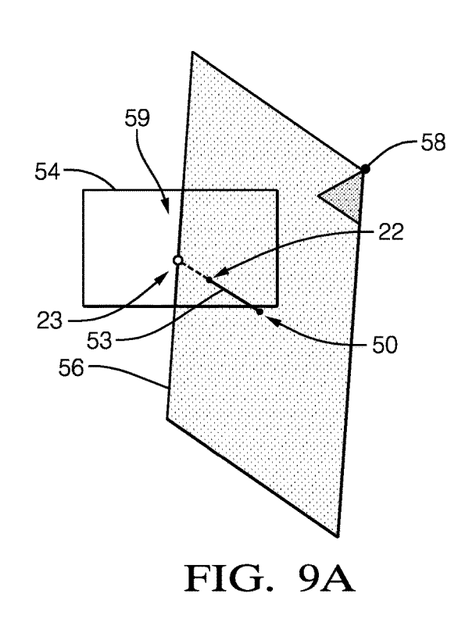
Figure 9B:
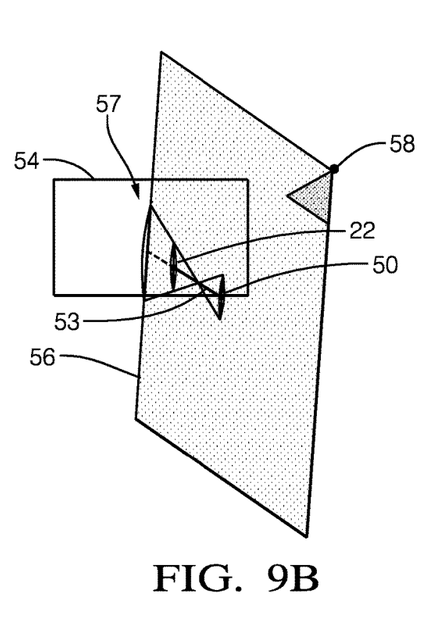

In FIGS. 8A and 8B the finger-tip 22 is far from the virtual display area 54, and in FIGS. 9A and 9B the finger-tip 22 is close to the virtual display area 54. Further, FIGS. 8A and 9A show an ideal situation where the reference points, i.e., the positions of the finger-tip 22 and the finger base 50, have no uncertainty, whereas in FIGS. 8B and 9B a certain uncertainty is assigned to the positions of the finger-tip 22 and the finger base 50. Due to the uncertainty of the reference points the intersection area on the virtual display area 54 is represented by an eclipse 57 rather than a point as can be seen from FIGS. 8B and 9B. The size of the eclipse 57 and thus the uncertainty of the intersection point decreases with the distance of the finger-tip 22 to the virtual display area 54.

An embodiment of a probabilistic mapping approach as performed in step 39 is described in the following.

First, a 2D map representing a discrete likelihood function for the predicted touch position is generated and updated. The 2D map represents the display area and includes a plurality of cells. A numeric value is assigned to each cell. The 2D map can have the same resolution as the display area or lower resolution by grouping pixels on the display area to discrete grid cells in the 2D map for speed-up and improved robustness.

In a first step the 2D map is initialized with zeros. The numeric value assigned to the cell in the 2D map into which the intersection point of the line falls is then incremented by a defined amount.

Cells adjacent to the cell into which the intersection point of the line falls are incremented depending on the projected uncertainty of the intersection point.

The weighting can be uniform, i.e., a constant value, or a function of the distance of the finger-tip to the intersection point, e.g., Gaussian Kernel.

If repeated over a sequence of consecutive frames, regions in the 2D map containing the predicted touch position several times will accumulate the likelihood and form out peaks in the corresponding 2D likelihood function.

In order to reduce the impact of previous measurements and to keep the 2D map current, the impact of entries from the past has to fade out over time.

For example, all cell values will be (a) decreased at the following time step by a constant value, or (b) scaled by a constant factor between 0 and 1, or (c) only individual observations are removed by applying the same method used to add new observations to the map, but by replacing the addition of values with the subtraction of the same values.

The latter approach requires maintaining a history of observations (e.g. a ring-buffer of the last N entries). All these steps ensure that the system will forget about the past at some point, thus, only including the data of the latest time steps.

The 2D touch prediction likelihood map is analyzed for each time step in order to localize peaks in the 2D touch prediction likelihood map. Peaks represent candidates for the predicted touch position. Each peak will be classified, for example, by (a) comparing the likelihood of the peak to a first predetermined threshold and/or comparing the spread of the peak to a predetermined second threshold, or (b) using machine learning techniques and annotated training data.

If a peak is classified as "significant", for example, if the likelihood of the peak exceeds the first threshold and/or the spread of the peak exceeds the second threshold, the horizontal and vertical coordinates of the peak center will be transformed into the coordinates of the display area and communicated to the output unit 13.

As an alternative approach, if the locations of buttons, icons or other elements on the display area are known, one can compute the total likelihood of an element to be targeted by the user's finger by summing up all map entries that are overlapping with the corresponding element. This step might require rescaling of the map or touch screen content. If the accumulated likelihood for the element exceeds a predetermined threshold, a "touch predicted" signal will be emitted together with an identifier of the corresponding touch screen element and will be transferred to the graphical content generator 17 in order to allow the graphical content generator 17 to modify the content displayed by the output unit 13 based on the predicted touch position.

Figure 10A:
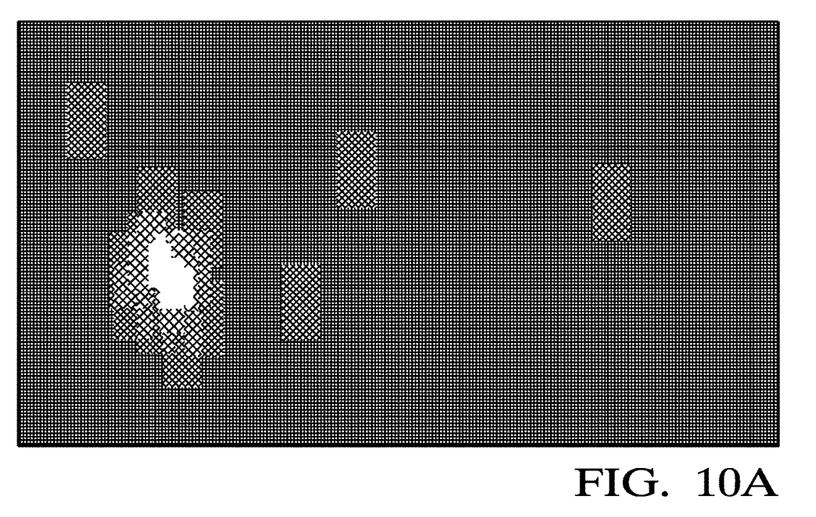
FIGS. 10A and 10B show examples of a touch prediction likelihood map.
Figure 10B:
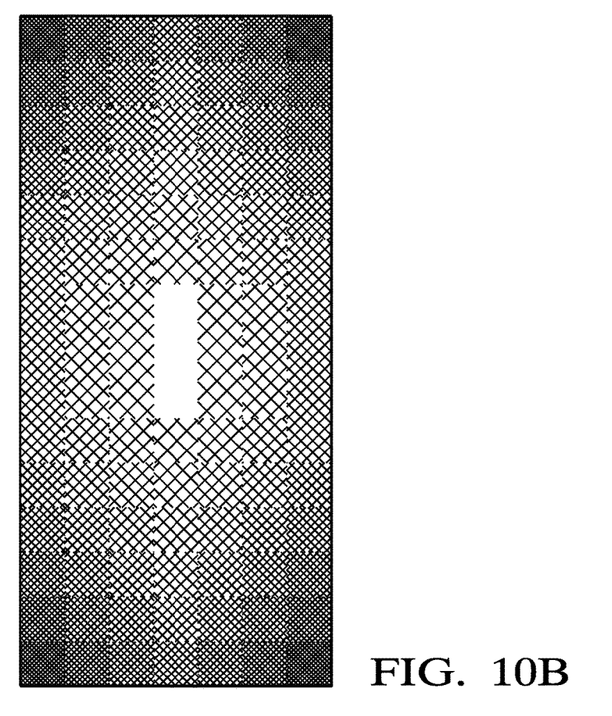

FIG. 10A shows an example of a touch prediction likelihood map and FIG. 10B shows an example of a kernel weight function representing the uncertainty of an individual measurement. The brighter the color of an individual point the more likely does this point correspond to the target position of the finger. Peaks in this 2D map above a defined threshold trigger touch prediction events.

Additional information communicated to the output unit 13 includes the Euclidean distance of the finger-tip to the output area, the finger-tip velocity and the time to touch.

In one embodiment the system 10 emits a "touch predicted" signal to the output unit 13 in case the predicted touch position lies within a defined zone on the output display and the time to touch is below a defined threshold.

While this invention has been described in terms of the preferred embodiments thereof, it is not intended to be so limited, but rather only to the extent set forth in the claims that follow.

LIST OF REFERENCE NUMERALS 10 system
11 3D imaging unit
12 processing and control unit
13 output unit
14 display area
15 field-of-view
16 processing unit
17 graphical content generator
20 hand
21 index finger
22 finger-tip
23 intersection point 24 pointing direction
30 to 42 step
50 finger base
51 hand center
52 line
53 line
54 virtual display area
56 vertical plane
57 eclipse
58 camera origin
59 line

We claim:

1. A system for monitoring 3D space in front of an output unit for the control of the output unit, said system comprising:
   a 3D imaging unit;
   a processing and control unit coupled to the 3D imaging unit; and
   an output unit comprising a display area, said output unit coupled to the processing and control unit, wherein
   the 3D imaging unit is configured to monitor an interaction zone in front of the display area of the output unit,
   the processing and control unit is configured to predict where a finger of a hand that approaches the display area of the output unit and is monitored by the three-dimensional imaging unit (3D imaging unit) will touch the display area, and to control the output unit to modify content displayed on the display area based on the predicted touch position,
   the processing and control unit is configured to localize a finger-tip and a finger base of the finger and to fit a line through the finger-tip and the finger base,
   the processing and control unit is configured to compute an intersection point of the line through the finger-tip and the finger base with the display area,
   the processing and control unit comprises a two-dimensional map (2D map) representing the display area and comprising a plurality of cells, and the processing and control unit is configured to compute the intersection point of the line with the display area in consecutive time steps, wherein for each of the time steps at least one of the cells is identified corresponding to the computed intersection point and a numeric value assigned to the at least one identified cell is incremented, and
   the processing and control unit is configured to find peaks in the 2D map for each of the time steps in order to identify the predicted touch position of the finger.

2. A system as claimed in claim 1, wherein the output unit is configured to display a plurality of elements on the display area, wherein at least one of the elements is highlighted and/or enlarged if the processing and control unit predicts that the finger of the hand will touch the at least one of the elements.

3. A system as claimed in claim 1, wherein the processing and control unit is configured to identify a hand with an exposed index finger in an image received from the 3D imaging unit.

4. A system as claimed in claim 1, wherein the processing and control unit is configured to compute an intersection line of a plane through the line and a camera origin of the 3D imaging unit with the display area, wherein, the predicted touch position of the finger lies on the intersection line (59).

5. A system as claimed in claim 1, wherein the processing and control unit is configured to compute a distance between the finger-tip and the predicted touch position, a velocity of the finger-tip, and the time when the finger-tip will touch the display area.

6. A system as claimed in claim 1, wherein the processing and control unit is configured to increment numeric values assigned to cells located within a certain distance around the at least one identified cell for each of the time steps, wherein the distance depends on an uncertainty of the computed intersection point.

7. A vehicle comprising a system as claimed claim 1, wherein the output unit comprises a human machine interface.

8. A method for monitoring three-dimensional space (3D space) in front of an output unit for the control of the output unit, said method comprising:
   monitoring an interaction zone in front of a display area of the output unit;
   predicting where a finger of a hand that approaches the display area of the output unit and is monitored will touch the display area; and
   controlling the output unit to modify content displayed on the display area based on the predicted touch position, wherein
   a finger-tip and a finger base of the finger are localized and a line is fitted through the finger-tip and the finger base,
   an intersection point of the line through the finger-tip and the finger base with the display area is computed,
   a two-dimensional map (2D map) representing the display area and comprising a plurality of cells is provided, and the intersection point of the line with the display area is computed in consecutive time steps, wherein for each of the time steps at least one of the cells is identified corresponding to the computed intersection point and a numeric value assigned to the at least one identified cell is incremented, and
   peaks are identified in the 2D map for each of the time steps in order to identify the predicted touch position of the finger.

9. The method as claimed in claim 8, wherein the output unit displays a plurality of elements on the display area and at least one of the elements is highlighted and/or enlarged if it is predicted that the finger of the hand, will touch the at least one of the elements.

10. The method as claimed in claim 8, wherein an intersection line of a plane through the line and a camera origin of the 3D imaging unit with the display area is computed, wherein, in particular, the predicted touch position of the finger lies on the intersection line.

* * * * *